UNITED STATES PATENT OFFICE.

ALBERT E. GREENE, OF CHICAGO, ILLINOIS.

PROCESS OF MELTING SCRAP METAL.

1,018,418.   Specification of Letters Patent.   Patented Feb. 27, 1912.

No Drawing.   Application filed June 30, 1910.   Serial No. 569,702.

*To all whom it may concern:*

Be it known that I, ALBERT E. GREENE, a citizen of the United States, residing at Chicago, in the county of Cook and State of Illinois, have invented a certain new and useful Improvement in Process of Melting Scrap Metal, of which the following is a full, clear, concise, and exact description.

My invention relates to a process of melting steel scrap rich in manganese, silicon or other alloys with pig iron, and converting the mixture into steel without substantial loss of the alloys.

Steel scrap added to molten iron can be melted in an electric furnace with a very small power consumption because of the heat in the iron, but it has been found impractical if not impossible to satisfactorily convert the charge into steel without great loss of one or more of the alloys. My invention provides a simple, efficient process whereby this objection is avoided.

In carrying out my invention, I first charge molten pig iron into an electric furnace provided with twyers for blowing the bath. I next add the manganese steel-scrap or other alloy steel-scrap to the molten iron and melt it, using the heat in the iron as far as possible and supplementing the heating by means of electricity. Then, while maintaining the bath molten, I blow the bath with a gas which will decarburize the metal without substantial loss of alloys, thereby converting the charge into steel. A gas suitable for this purpose is one containing a component which has reducing properties with respect to oxids of the alloying metals and also a component which has oxidizing properties with respect to carbon. The reducing and the oxidizing components of the gaseous mixture are preferably carbon monoxid ($CO$) and carbon dioxid ($CO_2$) in such relative proportions that the mixture as a whole will decarburize the molten bath without substantial oxidation of the metallic constituents thereof. The selective oxidation of carbon by means of such gas is set forth in my British Patent #9508 of April 21st, 1909, and also is described in my co-pending application, Serial Number 470,921, filed January 6, 1909.

Where the scrap contains acid forming metals like silicon, tungsten, titanium, vanadium and the like, which, in the presence of basic material, are rapidly eliminated from the metal, it is desirable to start with pig iron suitably free from phosphorus and sulfur and to carry out the process in an acid lined electric furnace. But for metals like manganese, nickel, chromium and the like a basic furnace can be used.

In certain cases where the pig iron available contains too much phosphorus and sulfur, I prefer first to remove these impurities from the pig iron by charging it in a basic lined electric furnace and, after adding lime and fluor spar, blowing it with gas of about the composition of blast furnace gas containing 20% to 25% $CO$ and 10% to 15% $CO_2$, as described in my application for patent, Serial No. 470,366, filed January 2nd, 1909. During this treatment the temperature is preferably maintained at about 1300° C. at which temperature the phosphorus comes out more readily than carbon. The sulfur may be removed at the same time in combination with calcium as calcium sulfid ($CaS$). After these impurities are removed to a suitable degree, the process of melting scrap in the pig iron is carried on as described above. If it is desired to melt manganese steel-scrap, such material may be added to the molten pig iron in the same basic furnace just referred to; but where it is desired to melt scrap containing alloys like silicon or other acid elements, I prefer to transfer the molten pig iron to an acid lined electric furnace.

I have found that the carbon can be removed from a bath of pig iron and manganese steel-scrap with a loss of less than 2.5% of the original content of manganese and I have found that at the same time nearly all the silicon can be retained if desired. This treatment produces very sound ingots.

It is immaterial what process be used to remove the phosphorus or sulfur from the pig iron, and I may do this by treating the pig iron in an electric furnace with ore or scale and lime while keeping the temperature low, and then, without removing the slag, melt the scrap and blow out the carbon with gas containing a reducing agent which will hold the phosphorus in the slag.

It is understood that my invention is not limited to any particular kind of alloy scrap nor to any type of furnace where the temperature can be regulated without oxidizing the alloys to be kept.

What I claim is:

1. The process of utilizing scrap material containing valuable alloys, which consists in melting the scrap with molten pig iron with the aid of electric heat, and treating the molten bath with a gas containing a reducing agent and an oxidizing agent to decarburize the bath without substantial loss of said alloying metal.

2. The process of making steel from molten pig iron and scrap containing valuable alloying metal, which consists in melting the scrap into the iron by means of the heat in the iron supplemented by electric heat, and finally decarburizing the bath by blowing it with a gas containing reducing and oxidizing components, thereby producing steel without substantial loss of the alloying ingredients.

3. The process of making alloy steel, which consists in charging alloy steel scrap into pig iron in an electric furnace, melting the scrap and simultaneously blowing through the furnace a gas having reducing properties with respect to the metal, and finally decarburizing the bath by means of a gas suitable for oxidizing the carbon without substantial oxidation of the metal.

4. The process of making manganese steel from pig iron and manganese-steel scrap, which consists in charging manganese steel scrap into molten pig iron, melting the charge with the aid of electric heat, oxidizing the carbon without substantial loss of manganese by blowing the bath with a gaseous agent containing a reducing component, and finally melting into the decarburized metal enough ferro-manganese, corresponding to the weight of iron charged, to give the desired percentage of manganese in the steel.

5. The process of making steel from pig iron and scrap, which consists in charging molten pig iron into a basic electric furnace, selectively oxidizing the phosphorus in preference to carbon while maintaining the bath molten at a low temperature, then charging into the bath scrap containing the alloying metal which it is desired to retain, and finally decarburizing the bath by blowing it with a gas suitable for oxidizing the carbon but having a reducing action on oxides of the metals composing the bath.

6. The process of making steel from pig iron and steel scrap, which consists in charging pig iron containing phosphorus and sulfur into a basic furnace and eliminating the phosphorus at a low temperature from the molten pig iron in preference to the carbon, then transferring the dephosphorized pig iron to an acid electric furnace, melting into the molten pig iron, with the aid of electric heat, steel scrap containing the valuable alloying metal which it is desired to retain, and finally decarburizing the bath without substantial loss of the alloying metal.

In witness whereof, I hereunto subscribe my name this twenty-ninth day of June, A. D., 1910.

ALBERT E. GREENE.

Witnesses:
 GEO. C. DAVISON,
 GEORGE E. FOLK.